US011526789B2

(12) United States Patent
Han et al.

(10) Patent No.: US 11,526,789 B2
(45) Date of Patent: Dec. 13, 2022

(54) METHOD FOR CONSTRUCTION OF LONG-TERM PREDICTION INTERVALS AND ITS STRUCTURAL LEARNING FOR GASEOUS SYSTEM IN STEEL INDUSTRY

(71) Applicant: DALIAN UNIVERSITY OF TECHNOLOGY, Dalian (CN)

(72) Inventors: Zhongyang Han, Dalian (CN); Jun Zhao, Dalian (CN); Wei Wang, Dalian (CN); Linqing Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 657 days.

(21) Appl. No.: 16/500,052

(22) PCT Filed: Sep. 12, 2018

(86) PCT No.: PCT/CN2018/105197
§ 371 (c)(1),
(2) Date: Oct. 1, 2019

(87) PCT Pub. No.: WO2020/051795
PCT Pub. Date: Mar. 19, 2020

(65) Prior Publication Data
US 2020/0285982 A1    Sep. 10, 2020

(51) Int. Cl.
*G06Q 10/06* (2012.01)
*G06Q 10/10* (2012.01)
(Continued)

(52) U.S. Cl.
CPC ............ *G06N 5/048* (2013.01); *G06K 9/622* (2013.01); *G06K 9/6262* (2013.01); *G06N 7/005* (2013.01); *G06Q 10/04* (2013.01)

(58) Field of Classification Search
CPC ........... G06Q 10/06; G06Q 10/10; G06N 5/04
(Continued)

(56) References Cited

U.S. PATENT DOCUMENTS 7,013,249 B1    3/2006  Davis
10,636,097 B2*  4/2020  Elser ................ G06F 16/24578
(Continued)

FOREIGN PATENT DOCUMENTS

CN        103426035 A    12/2013
CN        103473469 A    12/2013
(Continued)

*Primary Examiner* — Nga B Nguyen
(74) *Attorney, Agent, or Firm* — Muncy, Geissler, Olds & Lowe, P.C.

(57) ABSTRACT

The present invention belongs to the field of information technology, involving the techniques of fuzzy modeling, reinforcement learning, parallel computing, etc. It is a method combining granular computing and reinforcement learning for construction of long-term prediction interval and determination of its structure. Adopting real industrial data, the present invention constructs multi-layer structure for assigning information granularity in unequal length and establishes corresponding optimization model at first. Then considering the importance of the structure on prediction accuracy, Monte-Carlo method is deployed to learn the structural parameters. Based on the optimal multi-layer granular computing structure along with implementing parallel computing strategy, the long-term prediction intervals of gaseous generation and consumption are finally obtained. The proposed method exhibits superiority on accuracy and computing efficiency which satisfies the demand of real-world application. It can be also generalized to apply on other energy systems in steel industry.

1 Claim, 5 Drawing Sheets

(51) Int. Cl.
*G06N 5/04* (2006.01)
*G06K 9/62* (2022.01)
*G06N 7/00* (2006.01)
*G06Q 10/04* (2012.01)

(58) Field of Classification Search
USPC .......................................................... 706/52
See application file for complete search history.

(56) References Cited

U.S. PATENT DOCUMENTS

| | | | | |
|---|---|---|---|---|
| 2014/0058572 | A1* | 2/2014 | Stein ................. | H02J 13/00028 700/291 |
| 2014/0075004 | A1* | 3/2014 | Van Dusen ............. | H04L 41/04 709/223 |

FOREIGN PATENT DOCUMENTS

| | | |
|---|---|---|
| CN | 103514486 A | 1/2014 |
| CN | 106779384 A | 5/2017 |

* cited by examiner

METHOD FOR CONSTRUCTION OF LONG-TERM PREDICTION INTERVALS AND ITS STRUCTURAL LEARNING FOR GASEOUS SYSTEM IN STEEL INDUSTRY

TECHNICAL FIELD

The present invention belongs to the field of information technology, involving the techniques of fuzzy modeling, reinforcement learning, parallel computing, etc. It is a method combining granular computing and reinforcement learning for construction of long-term prediction interval and determination of its structure. Adopting real industrial data, the present invention constructs multi-layer structure for assigning information granularity in unequal length and establishes corresponding optimization model at first. Then considering the importance of the structure on prediction accuracy, Monte-Carlo method is deployed to learn the structural parameters. Based on the optimal multi-layer granular computing structure along with implementing parallel computing strategy, the long-term prediction intervals of gaseous generation and consumption are finally obtained. The proposed method exhibits superiority on accuracy and computing efficiency which satisfies the demand of real-world application. It can be also generalized to apply on other energy systems in steel industry.

BACKGROUND

Energy saving and emission reduction plays a pivotal role in steel industry. As the secondary energy which generates along with the production process, how to optimally utilize them is directly related to the economic interests of the enterprise. The gas of steel industry mainly consists of Blast Furnace Gas (BFG), Coke Oven Gas (COG) and Linz-Donawitz converter Gas (LDG). Due to the variation of production demands, load shift operation, etc., imbalance between generation and consumption always occurs, which requires a scheduling solution to rebuild the balance for supporting the production as well as being avoid of energy waste. During this process, tendency of the gas flow is an important reference to the staffs to make a decision. Therefore, prediction on the gas systems has significant meaning for practical application (C. Xiong. Discussion on energy saving for gas system in steel enterprise. (2011). Academic Annual Conference for Metallurgical Technology and Economy of China Metal Association (In Chinese)).

With the development of the related research, Granular Computing-based model can predict over four hours future trends (J. Zhao, Z. Y. Han, W. Pedrycz, W. Wang. (2016). Granular model of long-term prediction for energy system in steel industry[J]. IEEE transactions on cybernetics, 46(2), 388-400) (Z. Y. Han, J. Zhao, Q. Liu, W. Wang. (2016). Granular-computing based hybrid collaborative fuzzy clustering for long-term prediction of multiple gas holders levels[J]. Information Sciences, 330, 175-185). While owing to fact that the formation of the results are all numeric values, this model cannot satisfy the practical demand on measuring reliability. As such, besides the Support Vector Machine (SVM) and statistical-based models to construct prediction intervals (C. Y. Sheng, J. Zhao, W. Wang, H. Leung. (2013). Prediction intervals for a noisy nonlinear time series based on a bootstrapping reservoir computing network ensemble[J]. IEEE Transactions on neural networks and learning systems, 24(7), 1036-1048) (A. Khosravi, S. Nahavandi, D. (2010). Creighton. Construction of optimal prediction intervals for load forecasting problems[J]. IEEE Transactions on Power Systems, 25(3), 1496-1503.), extend the prototypes to interval values and solve the corresponding optimization model is also an effective solution (Z. Y. Han, J. Zhao, H. Leung, W. Wang. (2018). Construction of prediction intervals for gas flow systems in steel industry based on granular computing[J]. Control Engineering Practice, 78, 79-88).

However, the methods mentioned above have obvious shortcomings: First, due to the employment of iteration mechanism, SVM and statistical-based models performs not well for long-term prediction, which can only give accurate results in less than 60 data points; Second, although the one-layer structure for assigning information granularity can provide prediction intervals in a long period of time, the determination on the massive quantities of parameters results in unstable performance on computing cost and accuracy. If the parameters were determined layer by layer, the efficiency as well as average accuracy would be effectively improved. And given the multi-layer granular computing model, of which the structure is directly related to the accuracy of the results, it is highly demanded to design a learning approach for efficiently and reasonably obtain the optimal structural parameters.

SUMMARY OF THE INVENTION

The present invention is to solve the problem of constructing long-term prediction intervals for generation and consumption of secondary gas system in steel industry along with its structural learning. Adopting real industrial data, the present invention establishes a multi-layer structure for assigning information granularity in unequal length along with related optimization models at first. Then in order to adaptively determine the structure, the present invention deploys Monte-Carlo method for reinforced learning the structural parameters. Finally, the long-term prediction intervals are obtained by implementing parallel strategy to efficiently solve the problems layer by layer.

The technical solution of the present invention:

A method for construction of long-term prediction intervals and learning of its structure for gaseous system in steel industry, the procedures are as follows:

(1) Collecting data of generation and consumption amounts of the secondary gas system from real-time relational database. Implementing essential noise elimination, filtering and imputation.

(2) Using Fuzzy C-Means (FCM) algorithm to cluster the data so as to obtain the prototypes and corresponding fuzzy membership grades.

(3) Assigning the information granularity layer by layer, so that the numeric values are extended to intervals for constructing multi-layer optimization model.

(4) Implementing parallel computing strategy to solve the multi-layer optimization model for the assignment of information granularity. And utilizing probability, fuzzy modeling and other essential techniques to construct initial long-term prediction intervals.

(5) Defining the determined structure as the 'state', parameters change as 'action', then deploying Monte-Carlo method to reinforced approximate the policy value function. The optimal parameters can be consequently determined. And going back to (4) for obtaining the final long-term prediction intervals.

The beneficial effects of the present invention: by optimizing the information granularity layer by layer, the present invention overcomes the shortcomings of the traditional one-layer structure, such as excessive amounts of parameters to determine, low average accuracy, etc. The established optimization models take the coverage as the constraint, so that the objective is only specificity, which avoids the complexity on solving multi-objective problem. Furthermore, the employment of the Monte-Carlo method provides a reinforcement learning mechanism for structural learning of the model for constructing long-term prediction intervals. As such, the multi-layer granular computing structure can be adaptively determined. And with the implementation of parallel computing strategy during the process of both optimization and reinforcement learning, the efficiency is effectively guaranteed to satisfied the requirements of the practical applications.

The MVE denotes Mean-Variance Estimation method.

DETAILED DESCRIPTION

Figure 1:
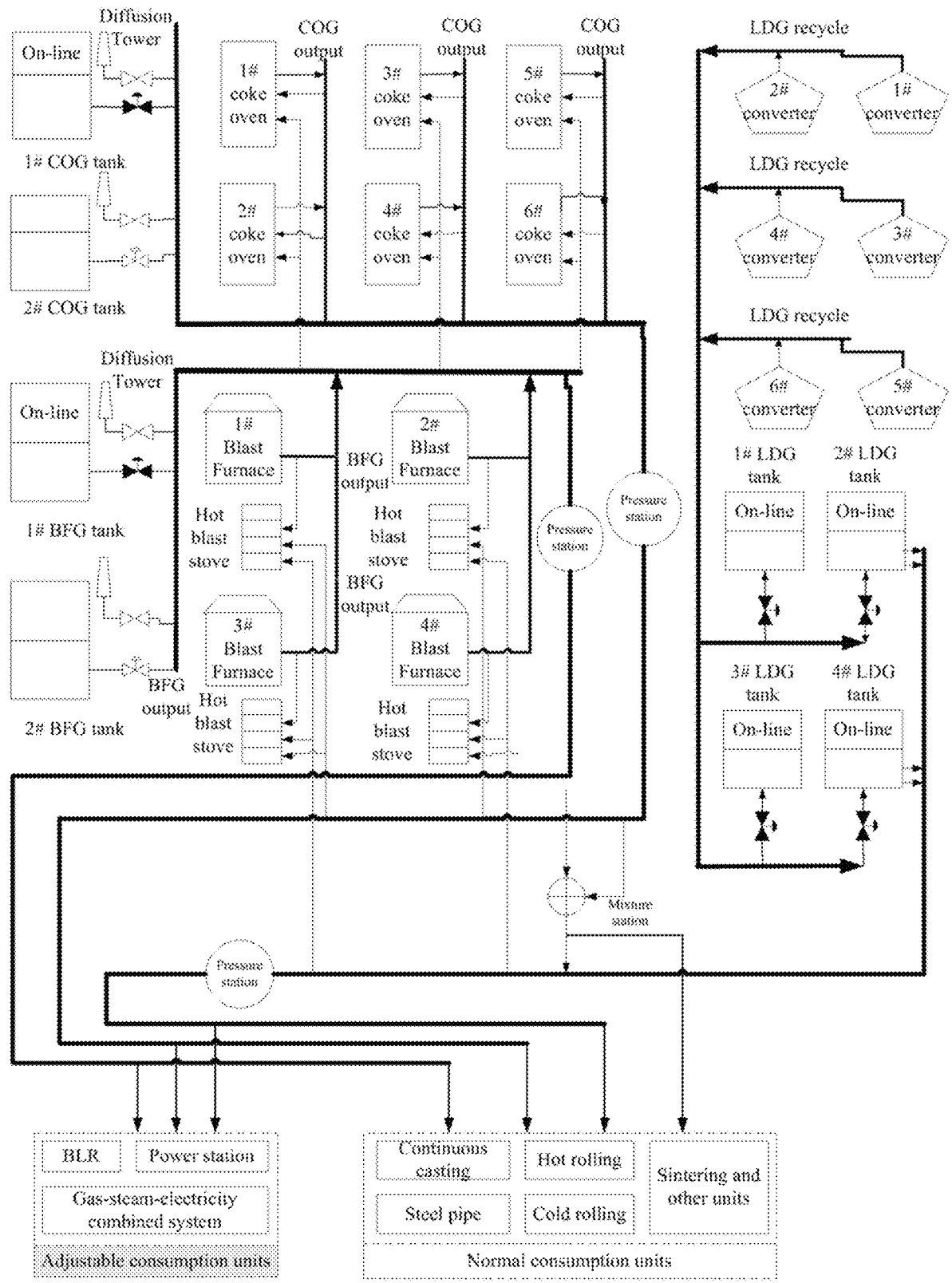
FIG. 1—Structure of the secondary gas system in steel industry.
Figure 2:
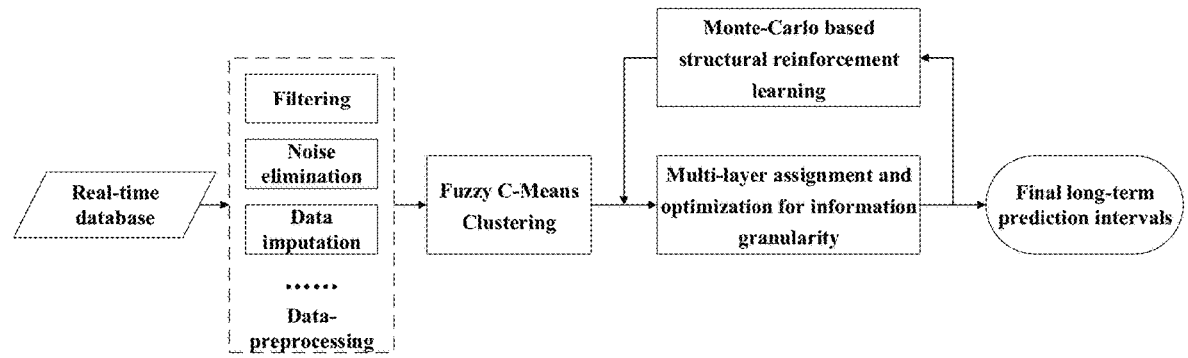
FIG. 2—Flow-chart for application of the present invention.
Figure 3:
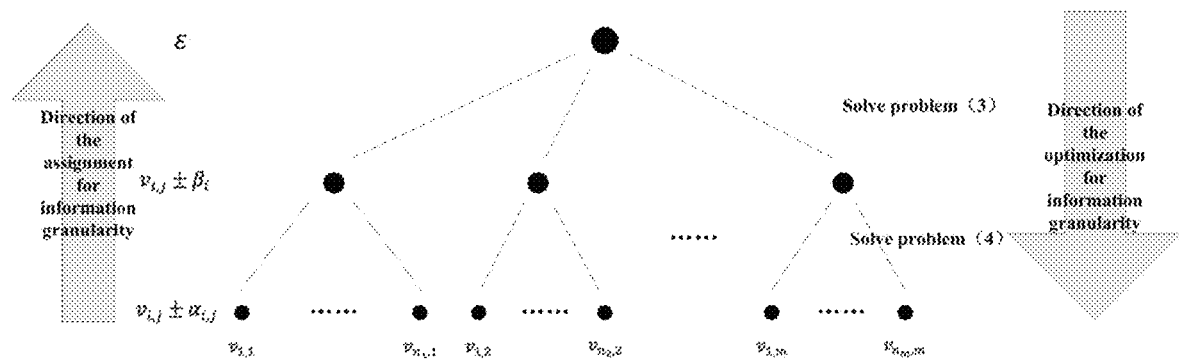
FIG. 3—Multi-layer structure for the assignment and optimization of the information granularity.

In order to further clarify the technical solution and implementation of the present invention, a secondary energy system of Shanghai Baosteel co., which behaves superior industrial automatic level in China, is deployed as an illustrative example. It can be concluded from the structure as depicted in FIG. 1 that 4 furnaces, 6 ovens and 6 converters form as the generation units, and cold/hot rolling, sintering, etc., are deemed as the consumption units. Specifically, low pressure boiler and power station are typically regarded as adjustable units. Besides, the gas tanks are used for storage and buffering. And the transmission system including mixture and pressure stations is to deliver the gas from the generation units to the consumption units. In real production, it is important for the staffs to keep balance between generation and consumption so as to support the production as well as save the energy and reduce the emission. The secondary gas network covers many processes, such as steel-making, iron-making, steel rolling, etc., which exhibits considerable complexity. And its characteristics involving strong nonlinear and large delay lead to difficulties on accurately estimate the future trends of generation and consumption amounts. Aims at solving the above problem, the present invention develops research and application for the prediction on the secondary gas system.

The detailed procedures for implementation are as follows:

Step 1: Data Pre-Processing

Data of generation and consumption units of the industrial energy system are collected from real-time relational database, and essential noise elimination, filtering and imputation are implemented.

Step 2: FCM

The data are divided into segments with equal length, i.e., $Z=\{z_1, z_2, \ldots, z_N\}$, where $z_i \in \mathbb{R}^n$, n denotes the number of data points in each segment, and N denotes the number of segments. FCM clustering algorithm is implemented so as to obtain the prototype matrix $V=\{v_1, v_2, \ldots, v_c\}$ and the corresponding fuzzy membership grades $U=\{u_1, u_2, \ldots, u_N\}$, where $v_i \in \mathbb{R}^n$, $u_i \in \mathbb{R}^c$, c denotes the dimension of the prototype matrix.

Step 3: Establishment of the Multi-Layer Granular Computing Model

As shown in FIG. 1, the information granularity $\alpha_{i,j}$ and $\beta_i$ are assigned from bottom to top on the prototype matrix $V=\{v_1, v_2, \ldots, v_c\}$, where $i=1, 2, \ldots, m$; $j=1, 2, \ldots, n_i$ and $n_1 \neq n_2 \neq \ldots \neq n_m$. As such, the numeric prototypes are successfully extended into the intervals. In order to optimize the above parameters, this method defines two indices, i.e., Coverage coy and Specificity spec, as follows:

$$\text{cov} \doteq \frac{1}{T}\sum_{i=1}^{T}\lambda_i \quad (1)$$

$$\text{spec} \doteq \text{range} - \frac{1}{T}\sum_{i=1}^{T}|\overline{z}_i - \underline{z}_i| \quad (2)$$

where T denotes the number of data points in a sample. $\lambda_i$ is a marker variable, which will be tagged as 1 if the constructed prediction interval covers the data point, otherwise it will be tagged as 0. range denotes the difference between the maximum and minimum value of the data points. $\overline{z}_i$ and $\underline{z}_i$ respectively represent the upper and lower bounds of the constructed prediction intervals.

The objective for optimizing this model is to maxmize the coy and spec. In detail, the coy should be greater than or equal to the prescribed confidence level $(1-\rho)\times 100\%$, where $\rho \in [0,1]$ denotes the level of significance. In order to avoid the difficulty and cumbersomeness of solving the multi-objective problem, Eq. (1) is considered as the constraints, meaning that the col) should be greater than or equal to the objective confidenece interval. The direction for optimizing the information granularities is opposite with the one for assignment. The optimization models are established as follows:

(1) $2^{nd}$ Layer $$\max \text{range}^{(2)} - \frac{1}{m}\sum_{i=1}^{m}|\overline{z}_i^{(2)} - \underline{z}_i^{(2)}| \quad (3)$$

$$\text{s.t. } \sigma_{min}^{(2)}\varepsilon \leq \frac{1}{m}\sum_{i=1}^{m}\beta_i \leq \sigma_{max}^{(2)}\varepsilon$$

$$\frac{1}{m}\sum_{i=1}^{m}\lambda_i^{(2)} \geq (1-\rho)\times 100\%$$

where $\text{range}^{(2)}$ denotes the difference between the maximum and minimum value of data points in $2^{nd}$ layer. $\overline{z}_i^{(2)}$ and $\underline{z}_i^{(2)}$ respectively represent the upper and lower bounds of the intervals. $\varepsilon$ is a hyper-parameter to control the overall information granulartiy. $\sigma_{min}^{(2)}$ and $\sigma_{max}^{(2)}$ are set to control $\beta_i$ for not excessively far from $\varepsilon$. $\lambda_i^{(2)}$ is a marker variable which is similar with $\lambda_i$, i.e., it will be tagged as 1 if the constructed prediction interval covers the data point in $2^{nd}$ layer, otherwise it will be tagged as 0.

(2) $1^{st}$ Layer

Being different with $2^{nd}$ layer, the $1^{st}$ layer is to solve a number of m optimization problems, each of which can be described as follows:

$$\max \text{range}_i^{(1)} = \frac{1}{n_i}\sum_{j=1}^{n_i}|\bar{z}_{i,j}^{(1)} - \underline{z}_{i,j}^{(1)}| \quad (4)$$

$$\text{s.t. } \sigma_{min}^{(1)}\beta_i \le \frac{1}{n_i}\sum_{j=1}^{n_i}\alpha_{i,j} \le \sigma_{max}^{(1)}\beta_i$$

$$\frac{1}{n_i}\sum_{j=1}^{n_i}\lambda_{i,j}^{(1)} \ge (1-\rho)\times 100\%$$

where $\text{range}_i^{(1)}$ denotes the difference between the maximum and minimum value of data points in each optimization problem of $1^{st}$ layer, i=1, 2, . . . , m. $\bar{z}_{i,j}^{(1)}$ and $\underline{z}_{i,j}^{(1)}$ respectively represent the upper and lower bounds of the constructed intervals in $1^{st}$ layer. $\sigma_{min}^{(1)}$ and $\sigma_{max}^{(1)}$ are set to control $\alpha_{i,j}$ for not being excessively far from $\beta_i$.

Considering the convergence rate and solving speed, Differential Evolution (DE) algorithm is deployed in the present invention to solve the optimization problems. It should be noted that based on the independency between the optimization problems in the $1^{st}$ layer, the present invention utilizes parallel strategy to largely reduce the computing time, so that the practical demands on timeliness can be fully satisfied.

Step 4: Construction of Long-Term Prediction Intervals

The Granular Computing based long-term prediction intervals construction method is basically to predict the fuzzy membership grades, in other words, to form relationship $\hat{u}_k = f(u_{k-n_f}, \ldots, u_{k-1})$, where $\hat{u}_k$ denotes the predicted fuzzy membership grades, $u_{k-n_f}, \ldots, u_{k-1}$ are the elements of the matrix of the fuzzy membership grades U, $n_f$ refers to the number of inputs in the relationship among the fuzzy membership grades. The relationship in the present invention is established in view of probability. For clarifying the process, the following definitions will be given in terms of numeric values. First, define the probability of a prototype $p(v_{i1}, \ldots, v_{in_f})$, the probability of a segment $p(z_{k-n_f}, \ldots, z_{k-1})$ and the symbiosis matrix $\mathbb{P}$ as follows:

$$p(v_{i1}, \cdots, v_{in_f}) \doteq \frac{\sum_{j=1}^{N}\mathbb{O}_j}{N} \quad (5)$$

$$p(z_{k-n_f}, \cdots, z_{k-1}) \doteq \{p(v_{i1}, \cdots, v_{in_f}) \mid \{i1, \cdots, in_f\} \in [1, c]\} \quad (6)$$

$$\mathbb{P} \doteq \{p(v_i \mid v_{j1}, \cdots, v_{jn_f}) \mid i = 1, \cdots, c; \{j1, \cdots, jn_f\} \in [1, c]\} \quad (7)$$

where $\{v_{i1}, \ldots, v_{in_f}\}$, $\{i1, i2, \ldots, in_f\} \in [1, c]$ are the elements of prototype matrix V. $z_{k-n_f}, \ldots, z_{k-1}$ are the elements of the data segments Z. $\mathbb{O}_j$ is a marker variable, which considers $\{u_{h1,j}=\max(u_{h1}), \ldots, u_{hn_f,j}=\max(u_{hn_f})\}$, where $\{u_{h1,j}, u_{h2,j}, \ldots, u_{hn_f,j}\}$ are the membership grades from $u_{h1}, u_{h2}, \ldots, u_{hn_f}$. $\{h1, h2, \ldots, hn_f\} \in [1, c]$. $\mathbb{O}_j$ will be tagged as 1 if $h1=i1, \ldots, hn_f=in_f$, otherwise 0. $p(v_i|v_j)$ is the conditional probability, denoting the probability of the fact that the maximum membership grade of $z_k$ is towards $v_i$, given that the maximum membership grades of $\{z_{k-n_f}, \ldots, z_{k-1}\}$ are towards $\{v_{j1}, \ldots, v_{jn_f}\}$.

Based on the above definitions, the probability of segment $z_k$ can be computed as $\hat{p}(z_k)=p(z_{k-n_f}, \ldots, z_{k-2}, z_{k-1})^T \times \mathbb{P}$, and the predicted $\hat{z}_k$ can be obtained by:

$$\hat{z}_k = \frac{\sum_{i=1}^{c}\hat{p}_i V}{\sum_{i=1}^{c}\hat{p}_i} \quad (8)$$

where $\hat{p}_i$ is the element of $\hat{p}(z_k)$.

Step 5: Reinforcement Learning for the Structural Parameters

The determination on the structure of the multi-layer granular computing model is regarded as a one-step Markov Decision Process, and then Monte-Carlo method is implemented including parameters m and $n_i$, i=1, 2, . . . , m. State S, action A and reward R are defined as follows:

S—a determined structure for multi-layer granular computing model.

A—to change the parameters m and $n_i$, i=1, 2, . . . , m.

R—the spec of the constructed prediction intervals.

Considering the large quantities of to-be-determined parameters, the gradient descend strategy is employed to learn the value function $\pi_\omega(s, a)$. Assuming $\pi_\omega(s, a)$ is a multi-layer perceptron neural network as follows:

$$\pi_\omega(s,a)=f(\omega^T\cdot\phi(s,a)+b) \quad (9)$$

where $\phi(s, a)$ refers to the feature vector of state-action pair, defining as $\phi(s, a)=(m, n_1, n_2, \ldots, n_m)^T$. b denotes the bias of the neural network. f is the activation function, which is sigmoid function in the present invention.

Define a derivative performance function as follows:

$$J(\omega) \doteq q_{\pi_\omega}(s_0) \quad (10)$$

where $q_{\pi_\omega}$ is the real-value function of $\pi_\omega(s, a)$. $s_0$ is the initial state. The gradient of $J(\omega)$ with regard to $\omega$ is computed and policy gradient theorem is applied, the weights $\omega$ can be updated by:

$$\omega_{t+1}=\omega_t+\tau\gamma\nabla_{\omega_t}\ln\pi_{\omega_t}(s,a)r_t \quad (11)$$

where $\tau$ denotes the step size, $\gamma$ is the discounting factor. $r_t$ is the reward obtained at t, which can be formulated as:

$$r_t = \frac{1}{T}\sum_{i=1}^{T}|\bar{z}_i - \underline{z}_i| \quad (12)$$

Assuming the dimension of searching space for the structure parameters as L, the procedures can be summarized as follows:

(1) Initializing $\tau>0$, $\gamma>0$, $\omega \in \mathbb{R}^{max(m)}$, taking l samples from L for training.

(2) Given t=1~l, Eq. (12) and then Eq. (11) in step 4 are computed, $\omega_{opt}$ for the policy value function is obtained. Considering the independence of the problems, the computation can be conducted by using parallel strategy for accelerating the process.

(3) Given t=1~=11, Eq. (9) is computed, the optimal structural parameters are then determined as the feature vector when the policy value function is at its maximum value:

$$\phi_{opt}(s,a)=\arg\max_{t=1,2,\ldots,L}(\pi_{\omega_{opt}}(s_t,a_t)) \quad (13)$$

(4) $\phi_{opt}(s, a)$ is used to compute Eq. (3)-(8), the final long-term prediction intervals can be obtained.

It can be concluded from the above process that the present invention assigns the information granularity layer by layer and optimize them with parallel strategy, so as to improve the computing efficiency and prediction accuracy on one hand. And it adaptively determines the multi-layer structure in terms of reinforcement learning on the other hand.

Figure 4:
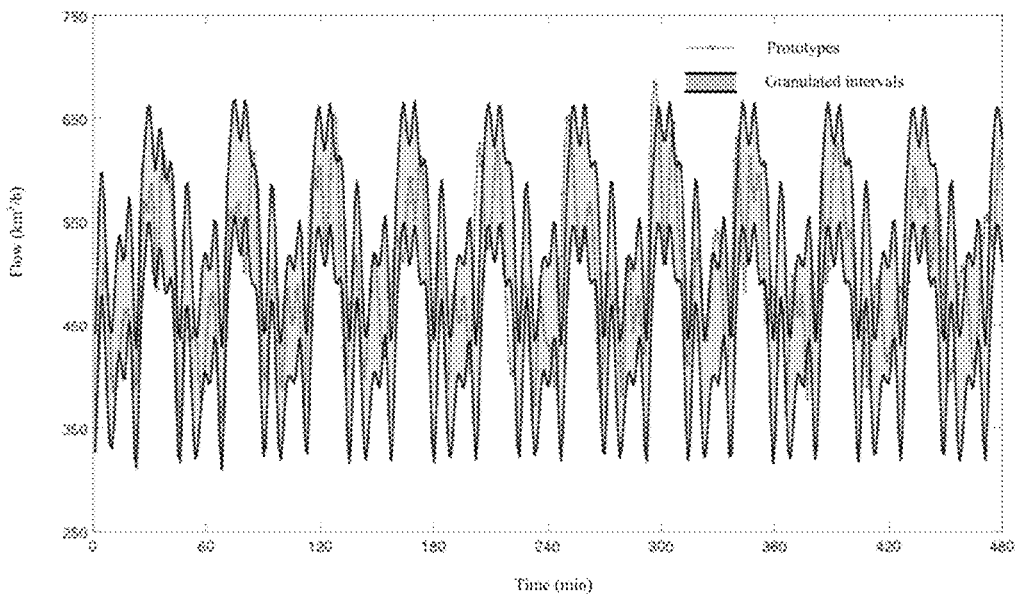
FIG. 4(a)—Constructed long-term prediction intervals by MVE for #2 BFG generation.
FIG. 4(b)—Constructed long-term prediction intervals by one-layer Granular Computing method for #2 BFG generation.
FIG. 4(c)—Constructed long-term prediction intervals by the method of the present invention for #2 BFG generation.
Figure 4:
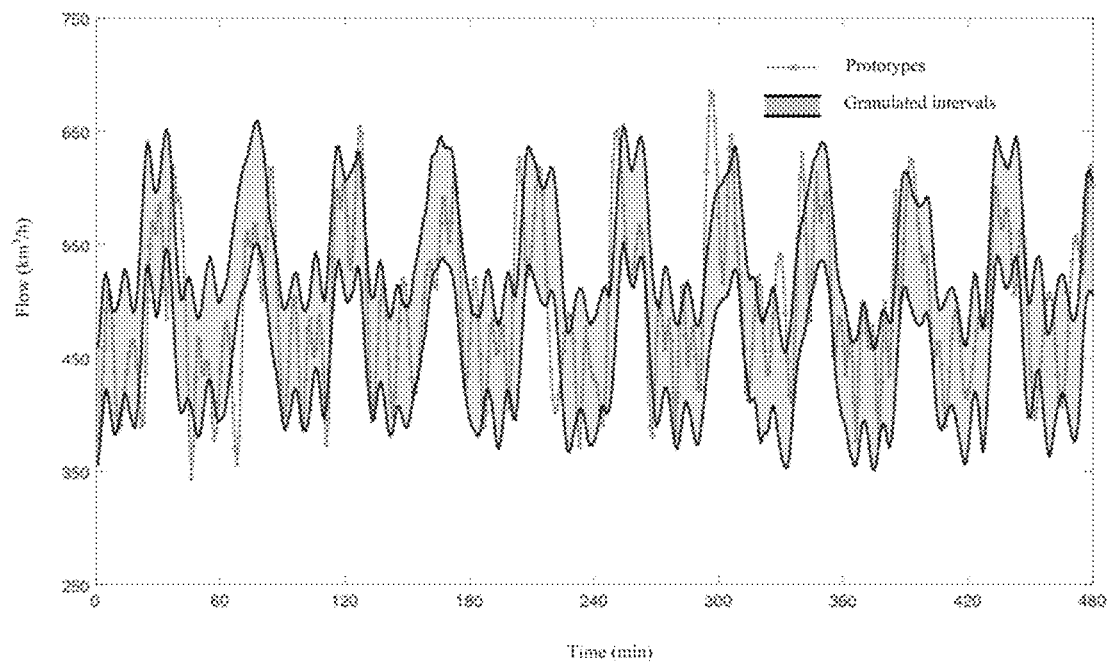
Figure 4:
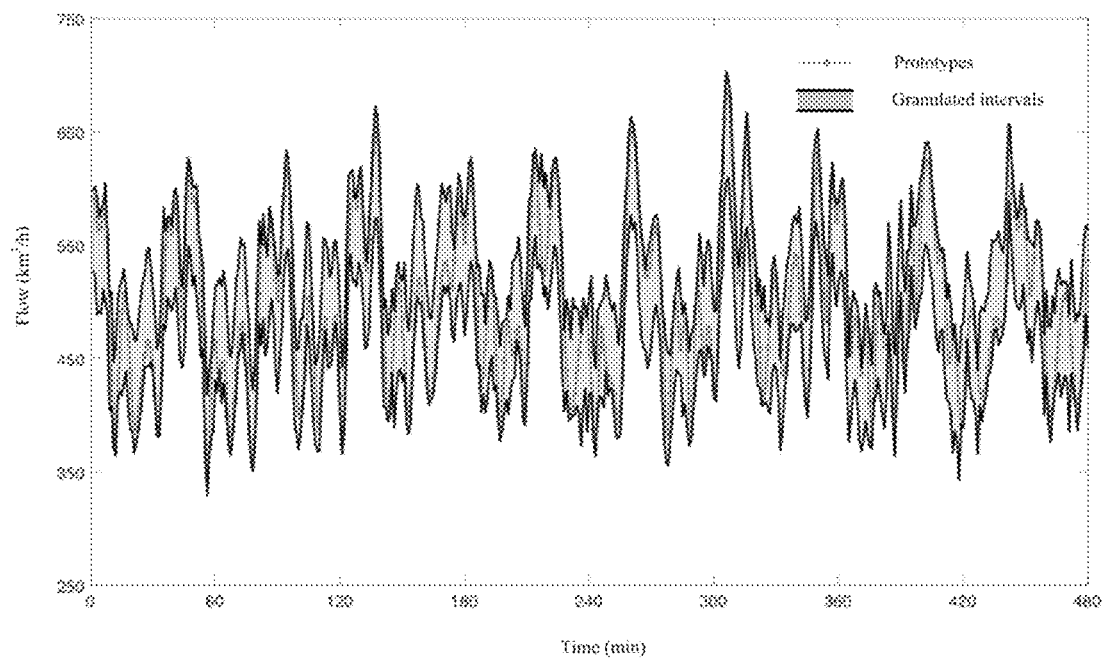
Figure 5:
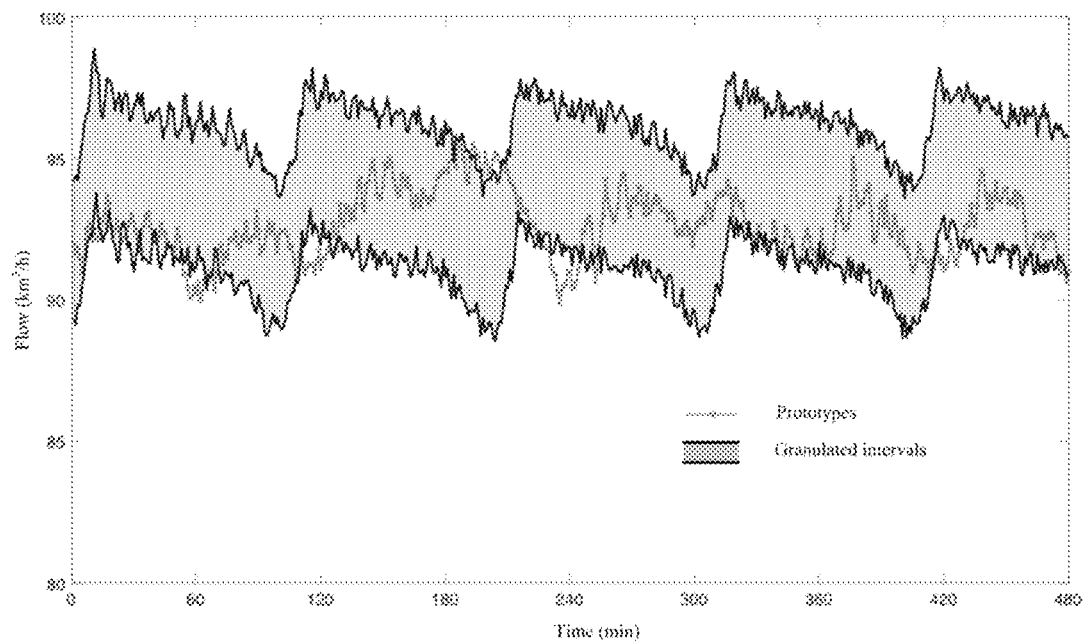
FIG. 5(a)—Constructed long-term prediction intervals by MVE for #1 COG consumption.
FIG. 5(b)—Constructed long-term prediction intervals by one-layer granular computing method for #1 COG consumption.
FIG. 5(c)—Constructed long-term prediction intervals by the method of the present invention for #1 COG consumption.
Figure 5:
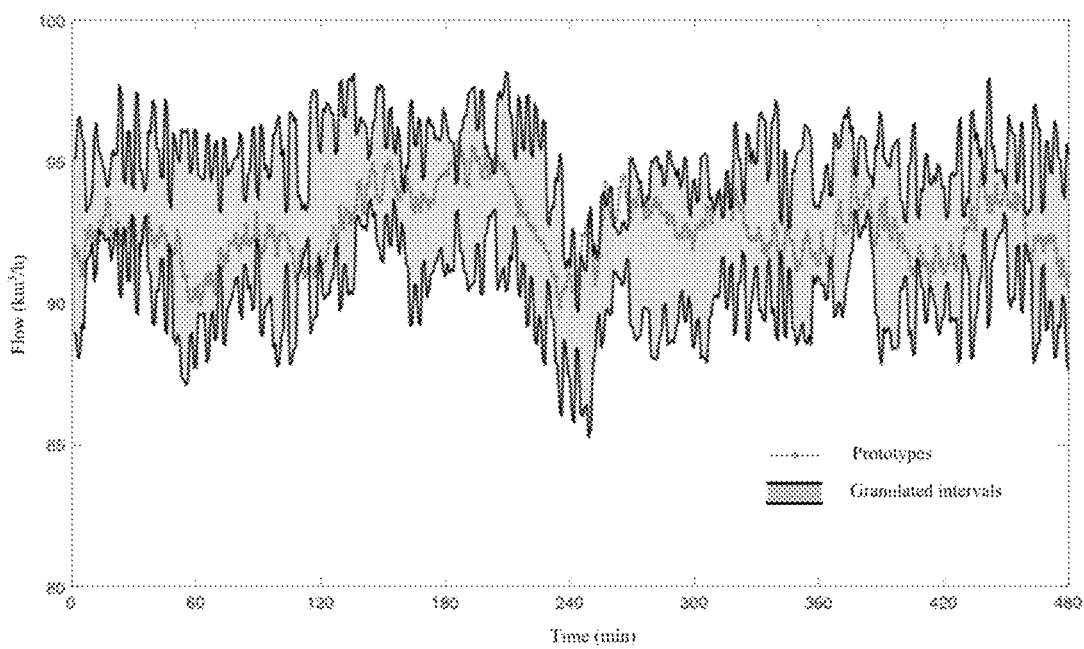
Figure 5:
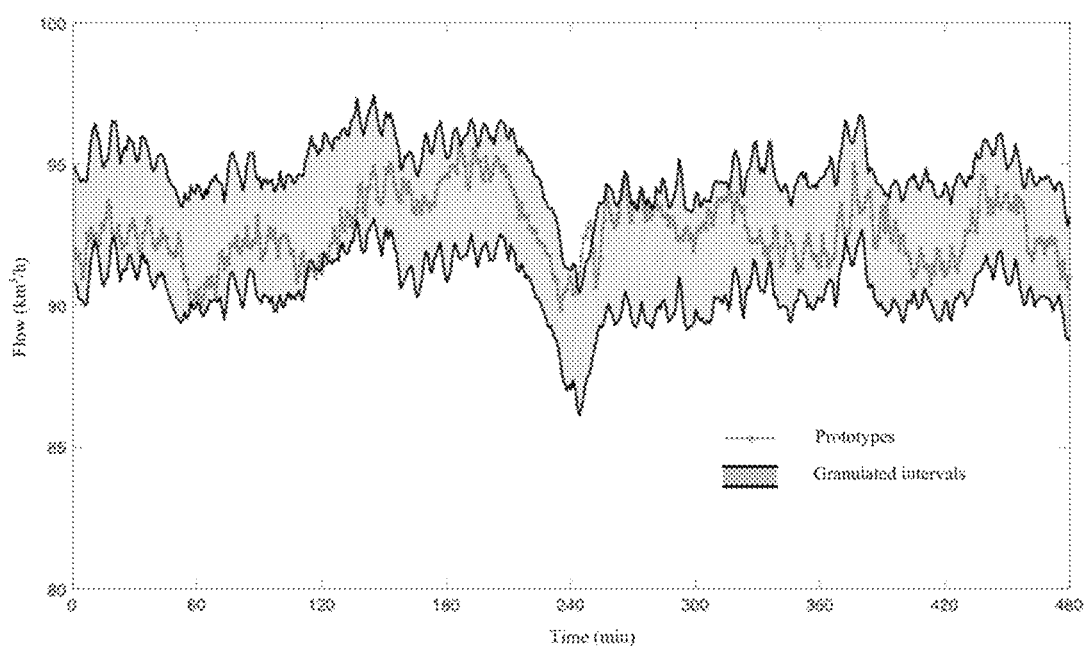

The constructed long-term prediction intervals for #2 BFG generation and #1 COG generation are given as FIGS. 4 and 5, in which the prediction length is 480 points, i.e., 8 hours. (a) shows the results of Mean-Variance Estimation, (b) for one-layer granular computing model, and (c) for method of the present invention. The dotted line denotes the real values, and the gray zone represents the constructed prediction intervals. Statistics involving prediction accuracy and computing efficiency are given as Table 1, including Prediction Intervals Coverage Probability (PICP), Prediction Intervals Normalized Average Width (PINAW), Interval Score (IS) and Computing Time (CT). The PICP, PINAW and IS are defined as follows:

$$PICP = \frac{1}{T_{test}}\sum_{i=1}^{T_{test}}\lambda_i \times 100\% \quad (14)$$

$$PINAW = \frac{1}{T_{test}(d_{max}-d_{min})}\sum_{i=1}^{T_{test}}|\overline{z}_i - \underline{z}_i| \quad (15)$$

$$IS(\overline{z}_i, \underline{z}_i, t_i) = \frac{1}{T_{test}}\sum_{i=1}^{T_{test}} e_i \times 100\% \quad (16)$$

where $T_{test}$ denotes the number of data points in testing set. $\lambda_i$ is marker variable which will be tagged as 1 if the constructed prediction interval covers the data points in training set, otherwise it will be 0. $\overline{z}_i$ and $\underline{z}_i$ respectively represents the upper and lower bounds of the prediction intervals. $d_{max}$ and $d_{min}$ respectively refers to the maximum and minimum value of the testing set. $e_i$ is defined as a piecewise variable as follows:

$$e_i = \begin{cases} -2\rho(\overline{z}_i - \underline{z}_i) - 4(\underline{z}_i - d_i), & \text{when } d_i < \underline{z}_i \\ -2\rho(\overline{z}_i - \underline{z}_i), & \text{when } \underline{z}_i \leq d_i \leq \overline{z}_i \\ -2\rho(\overline{z}_i - \underline{z}_i) - 4(d_i - \overline{z}_i), & \text{when } d_i > \overline{z}_i \end{cases} \quad (17)$$

where $d_i$ is the data points in testing set, $\rho=0.1$. Obviously, the present invention exhibits superiority on both accuracy and efficiency comparing with other commonly deployed methods.

TABLE 1

Comparison of accuracy and computing time on the three methods for construction of long-term prediction intervals

| Item | Method | PICP (%) | PINAW | IS | CT (s) |
|---|---|---|---|---|---|
| #2 BFG generation | MVE | 67.76 | 0.33 | −63.08 | 11.34 |
| | One-layer Granular Computing | 65.71 | 0.30 | −64.35 | 53.17 |

TABLE 1-continued

Comparison of accuracy and computing time on the three methods for construction of long-term prediction intervals

| Item | Method | PICP (%) | PINAW | IS | CT (s) |
|---|---|---|---|---|---|
| | The present invention | 96.46 | 0.26 | −18.33 | 9.81 |
| #1 COG generation | MVE | 77.50 | 0.87 | −1.63 | 10.54 |
| | One-layer Granular Computing | 88.54 | 0.88 | −1.27 | 59.93 |
| | The present invention | 95.13 | 0.73 | −0.92 | 7.98 |

The invention claimed is:

1. A method for construction of long-term prediction intervals and its structural learning approach for generation and consumption of an industrial energy system, the method comprising steps of:

step 1: data pre-processing
collecting data of generation and consumption units of the industrial energy system from real-time relational database, and implement essential noise elimination, filtering and imputation;

step 2: Fuzzy C-Means (FCM)
dividing the data into segments with equal length, i.e., $Z=\{z_1, z_2, \ldots, z_N\}$, where $Z_i \in \mathbb{R}^n$, n denotes the number of data points in each segment, and N is the number of segments; implementing FCM clustering algorithm so as to obtain the prototype matrix $V=\{v_1, v_2, \ldots, v_c\}$ and the corresponding fuzzy membership grades $U=\{u_1, u_2, \ldots, u_N\}$, where $V_i \in \mathbb{R}^n$, $u_i \in \mathbb{R}^c$, C denotes the dimension of the prototype matrix;

step 3: establishment of the multi-layer granular computing model
assigning information granularity $\alpha_{i,j}$ and $\beta_i$ from bottom to top on the prototype matrix $V=\{v_1, v_2, \ldots, v_c\}$, where $i=1, 2, \ldots, m$; $j=1, 2, \ldots, n_i$ and $n_1 \neq n_2 \neq \ldots \neq n_m$; as such, the numeric prototypes are successfully extended into the intervals; in order to optimize the above parameters, this method defines coverage cov and specificity spec, as follows:

$$\text{cov} \doteq \frac{1}{T}\sum_{i=1}^{T}\lambda_i \quad (1)$$

$$\text{spec} \doteq \text{range} - \frac{1}{T}\sum_{i=1}^{T}|\overline{z}_i - \underline{z}_i| \quad (2)$$

where T denotes the number of data points in a sample; $\lambda_i$ is a marker variable, which will be tagged as 1 if the constructed prediction interval covers the data point, otherwise it will be tagged as 0; range denotes the difference between the maximum and minimum value of the data points; $\overline{z}_i$ and $\underline{z}_i$ respectively represent the upper and lower bounds of the constructed prediction intervals;

maximizing the cov and spec; wherein, the cov should be greater than or equal to the prescribed confidence level $(1-\rho) \times 100\%$, where $\rho \in [0,1]$ denotes the level of significance; considering Eq. (1) as the constraints, meaning that the cov should be greater than or equal to the objective confidenece interval; the direction for optimizing the information granularities is opposite with the one for assignment; the optimization models are established as follows:

(1) $2^{nd}$ layer $$\max \text{range}^{(2)} - \frac{1}{m}\sum_{i=1}^{m}|\bar{z}_i^{(2)} - \underline{z}_i^{(2)}| \quad (3)$$

$$\text{s.t. } \sigma_{min}^{(2)}\varepsilon \leq \frac{1}{m}\sum_{i=1}^{m}\beta_i \leq \sigma_{max}^{(2)}\varepsilon$$

$$\frac{1}{m}\sum_{i=1}^{m}\lambda_i^{(2)} \geq (1-\rho)\times 100\%$$

where range$^{(2)}$ denotes the difference between the maximum and minimum value of data points in $2^{nd}$ layer; $\bar{z}_i^{(2)}$ and $\underline{z}_i^{(2)}$ respectively represent the upper and lower bounds of the intervals; $\varepsilon$ is a hyper-paramter to control the overall information granulartiy; $\sigma_{min}^{(2)}$ and $\sigma_{max}^{(2)}$ are set to control $\beta_i$ for not excessively far from $\varepsilon$; $\lambda_i^{(2)}$ is a marker variable which is similar with $\lambda_i$, which is tagged as 1 if the constructed prediction interval covers the data point in $2^{nd}$ layer, otherwise tagged as 0;

(2) $1^{st}$ layer being different with $2^{nd}$ layer, the $1^{st}$ layer is to solve a number of m optimization problems, each of which can be described as follows:

$$\max \text{range}_i^{(1)} - \frac{1}{n_i}\sum_{j=1}^{n_i}|\bar{z}_{i,j}^{(1)} - \underline{z}_{i,j}^{(1)}| \quad (4)$$

$$\text{s.t. } \sigma_{min}^{(1)}\beta_i \leq \frac{1}{n_i}\sum_{j=1}^{n_i}\alpha_{i,j} \leq \sigma_{max}^{(1)}\beta_i$$

$$\frac{1}{n_i}\sum_{j=1}^{n_i}\lambda_{i,j}^{(1)} \geq (1-\rho)\times 100\%$$

where range$_i^{(1)}$ denotes the difference between the maximum and minimum value of data points in each optimization problem of $1^{st}$ layer, i=1, 2, . . . , m; $\bar{z}_{i,j}^{(1)}$ and $\underline{z}_{i,j}^{(1)}$ respectively represent the upper and lower bounds of the constructed intervals in $1^{st}$ layer; $\sigma_{min}^{(1)}$ and $\sigma_{max}^{(1)}$ are set to control $\alpha_{i,j}$ for not being excessively far from $\beta_i$;

step 4: construction of long-term prediction intervals the granular computing based long-term prediction intervals construction method is to predict the fuzzy membership grades, that is, to form relationship $\hat{u}_k = f(u_{k-n_f}, \ldots, u_{k-1})$, where $\hat{u}_k$ denotes the predicted fuzzy membership grades, $u_{k-n_f}, \ldots, u_{k-1}$ are the elements of the matrix of the fuzzy membership grades, $n_f$ refers to the number of inputs in the relationship among the fuzzy membership grades; for clarifying the process, the following definitions will be given in terms of numeric values; first, defining the probability of a prototype $p(v_{i1}, \ldots, v_{in_f})$, the probability of a segment $p(z_{k-n_f}, \ldots, z_{k-1})$ and the symbiosis matrix $\mathbb{P}$ as follows:

$$p(v_{i1}, \cdots, v_{in_f}) \doteq \frac{\sum_{j=1}^{N} \mathbb{O}_j}{N} \quad (5)$$

$$p(z_{k-n_f}, \cdots, z_{k-1}) \doteq \{p(v_{i1}, \cdots, v_{in_f}) | \{i1, \cdots, in_f\} \in [1, c]\} \quad (6)$$

$$\mathbb{P} \doteq \{p(v_i | v_{j1}, \cdots, v_{jn_f}) | i = 1, \cdots, c; \{j1, \cdots, jn_f\} \in [1, c]\} \quad (7)$$

where $\{v_{i1}, \ldots, v_{in_f}\}$, $\{i1, i2, \ldots, in_f\} \in [1, c]$ are the elements of prototype matrix V; $z_{k-n_f}, \ldots, z_{k-1}$ are the elements of the data segments Z; $\mathbb{O}_j$ is a marker variable, which considers $\{u_{h1,j}=\max(u_{h1}), \ldots, u_{hn_f,j}=\max(u_{hn_f})\}$, where $\{u_{h1,j}, u_{hd,j}, \ldots, u_{hn_f,j}\}$ are the membership grades from $u_{h1}, u_{h2}, \ldots, u_{hn_f}$, $\{h1, h2, \ldots, hn_f\} \in [1, c]$; $\mathbb{O}_j$ will be tagged as 1 if h1=i1, . . . , hn$_f$=in$_f$, otherwise 0; $p(v_i|v_j)$ is the conditional probability, denoting the probability of the fact that the maximum membership grade of $Z_k$ is towards $v_i$, given that the maximum membership grades of $\{z_{k-n_f}, \ldots, z_{k-1}\}$ are towards $\{v_{j1}, \ldots, v_{jn_f}\}$;

based on the above definitions, the probability of segment $z_k$ can be computed as $\hat{p}(z_k) = p(z_{k-n_f}, \ldots, z_{k-2}, z_{k-1})^T \times \mathbb{P}$, and the predicted $\hat{z}_k$ can be obtained by:

$$\hat{z}_k = \frac{\sum_{i=1}^{c}\hat{p}_i V}{\sum_{i=1}^{c}\hat{p}_i} \quad (8)$$

where $\hat{p}_i$ is the element of $\hat{p}(z_k)$;

step 5: reinforcement learning for the structural parameters regarding the determination on the structure of the multi-layer granular computing model as a one-step Markov Decision Process, and then implementing Monte-Carlo method, including parameters m and $n_i$, i=1, 2, . . . , m; defining state S, action A and reward R as follows:

S—a determined structure for multi-layer granular computing model;

A—to change the parameters m and $n_i$, i=1, 2, . . . , m;

R—the spec of the constructed prediction intervals;

considering the large quantities of to-be-determined parameters, the gradient descend strategy is employed to learn the value function $\pi_\omega(s, a)$; assuming $\pi_\omega(s, a)$ is a multi-layer perceptron neural network as follows:

$$\pi_\omega(s,a) = f(\omega^T \cdot \phi(s,a) + b) \quad (9)$$

where $\phi(s, a)$ refers to the feature vector of state-action pair, defining as $\phi(s, a) = (m, n_1, n_2, \ldots, n_m)^T$; b denotes the bias of the neural network; f is the activation function, which is sigmoid function;

defining a derivative performance function as follows:

$$J(\omega) \doteq q_{\pi_\omega}(s_0) \quad (10)$$

where $q_{\pi_\omega}$ is the real-value function of $\pi_\omega(s, a)$; $s_0$ is the initial state; computing the gradient of $J(\omega)$ with regard to $\omega$ and apply policy gradient theorem, the weights $\omega$ can be updated by:

$$\omega_{t+1} = \omega_t + \tau\gamma\nabla_\omega \ln\pi_\omega(s,a)r_t \quad (11)$$

where $\tau$ denotes the step size, $\gamma$ is the discounting factor; $r_t$ is the reward obtained at t, which can be formulated as:

$$r_t = \frac{1}{T}\sum_{i=1}^{T}|\bar{z}_i - \underline{z}_i| \quad (12)$$

assuming the dimension of searching space for the structure parameters as L, the procedures can be summarized as follows:

(1) initializing $\tau>0$, $\gamma>0$, $\omega \in \mathbb{R}^{max(m)}$, taking l samples from L for training;
(2) given t=1~l, computing Eq. (12) and then Eq. (11) in step 4, obtaining $\omega_{opt}$ for the policy value function; considering the independence of the problems, the computation can be conducted by using parallel strategy for accelerating the process;
(3) given t=1~l, compute Eq. (9), the optimal structural parameters are then determined as the feature vector when the policy value function is at its maximum value:

$$\phi_{opt}(s,a) = \arg\max\nolimits_{t=1,2,\ldots,L}(\pi_{\omega_{opt}}(s_t, a_t)) \quad (13)$$

(4) using $\phi_{opt}(s, a)$ to compute Eq. (3)-(8), the final long-term prediction intervals can be obtained; and
generating and consuming the industrial energy system using the obtained final long-term prediction intervals.

* * * * *